United States Patent
Zumwalt et al.

(10) Patent No.: US 10,139,429 B2
(45) Date of Patent: Nov. 27, 2018

(54) METHOD FOR CALIBRATING AND IMAGING USING MULTI-TIP SCANNING PROBE MICROSCOPE

(71) Applicant: FEI Company, Hillsboro, OR (US)

(72) Inventors: Sean Dale Zumwalt, Oxnard, CA (US); Anton Riley, Santa Ynez, CA (US); Jordan Fine, Ventura, CA (US); Rohit Jain, Ventura, CA (US)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 15/591,071

(22) Filed: May 9, 2017

(65) Prior Publication Data

US 2018/0275165 A1 Sep. 27, 2018

Related U.S. Application Data

(60) Provisional application No. 62/476,548, filed on Mar. 24, 2017.

(51) Int. Cl.
*G01Q 60/38* (2010.01)
*G01Q 40/00* (2010.01)

(52) U.S. Cl.
CPC ............ *G01Q 40/00* (2013.01); *G01Q 60/38* (2013.01)

(58) Field of Classification Search
CPC .................................................. G01Q 40/00
USPC ....................................... 850/19, 33; 73/105
See application file for complete search history.

(56) References Cited

U.S. PATENT DOCUMENTS

| | | | |
|---|---|---|---|
| 6,185,991 B1 | 2/2001 | Hong et al. | |
| 6,244,103 B1 | 6/2001 | Berghaus et al. | |
| 6,951,130 B2 | 10/2005 | Hare et al. | |
| 7,415,868 B2* | 8/2008 | Hare | G01Q 30/04 250/306 |
| 7,949,180 B2* | 5/2011 | Maeda | G06T 7/90 382/162 |

(Continued)

OTHER PUBLICATIONS

Ahn, S. et al., "Geometric Least Squares Fitting of Circle and Ellipse," International Journal of Pattern Recognition and Artificial Intelligence, Nov. 1999, 13(07):pp. 987-996.

(Continued)

*Primary Examiner* — Phillip A Johnston
(74) *Attorney, Agent, or Firm* — Scheinberg & Associates, P.C.; Michael O. Scheinberg

(57) ABSTRACT

Systems, methods, and program products are provided for the calibration and scanning of multiple AFM probe heads used employed together for synchronous scanning. An automated calibration process is provided employing scan data from multiple AFM probe heads to automatically calibrate the system and position the probe heads at relative offset positions that are successively closer and more precise. Multiple heads are scanned simultaneously and synchronously to produce scan images, which are automatically evaluated to recognize a common feature. From this, a relative offset of the images is calculated and the true position of each probe tip may be known. Using this knowledge, a position offset is applied to bring the probe tips closer together at a desired spatial relationship. The techniques may be repeated at two or more levels varying from coarse to fine, and may be repeated after probing or movement to a new region of interest.

17 Claims, 14 Drawing Sheets

(56) References Cited

U.S. PATENT DOCUMENTS

| | | | |
|---|---|---|---|
| 8,051,493 B2 * | 11/2011 | Ulcinas | B82Y 20/00 250/306 |
| 2003/0168594 A1 | 9/2003 | Muckenhirn | |
| 2006/0185424 A1 | 8/2006 | Muckenhirn | |
| 2011/0016592 A1 | 1/2011 | Svensson et al. | |
| 2013/0254948 A1 | 9/2013 | Hartong et al. | |
| 2016/0231353 A1 | 8/2016 | Erickson et al. | |

OTHER PUBLICATIONS

Al-Sharaqdah, A. et al., "Error analysis for circle fitting algorithms." Jul. 2, 2009, arXiv:0907.0421v1, 30 pages.

Bernard, Florian et al., "A Solution for Multi-Alignment by Transformation Synchronisation," IEEE Conference on Computer Vision and Pattern Recognition (CVPR) 2015 (https://arxiv.org/abs/1410.8546), 9 pages.

Cahill, N. et al., "Overlap Invariance of Cumulative Residual Entropy Measures for Multimodal Image Alignment," SPIE, Feb. 2009, vol. 7259, 12 pages.

Desolneux, A. et al., "Edge Detection by Helmholtz Principle," Journal of Mathematical Imaging and Vision, (2001), vol. 14, pp. 271-284, Kluwer Academic Publishers, Manufacture in the Netherlands.

Kennedy, et al., "Identifying maximal rigid components in bearing-based localization," IEEE/RSJ International Conference on Intelligent Robots and Systems, Oct. 2012, W911NF-10-2-0016, 8 pages.

Ozyseli, O. et al., "Robust Camera Location Estiation by Convex Programming," CVPR2015, Jun. 4, 2015, arXiv:1412.0165v2, 10 pages.

P. Girard, "Electrostatic Force Microscopy: Principles and Some Applications to Semiconductors," Institute of Physics Publishing—Nanotechnology, Nov. 27, 2001, vol. 12, pp. 485-490.

Thunberg, Johan et al., "On Transitive Consistency for Linear Invertible Transformations between Euclidean Coordinate Systems," (2015) https://arxiv.org/abs/1509.00728, 25 pages.

* cited by examiner

METHOD FOR CALIBRATING AND IMAGING USING MULTI-TIP SCANNING PROBE MICROSCOPE

CROSS REFERENCE TO RELATED APPLICATIONS

N/A.

BACKGROUND OF THE INVENTION

1. Field of the Invention

The invention related to scanning probe microscopy for scanning and probing a sample with multi-tip scanning probes.

2. Background

A scanning probe microscope (SPM) is a type of microscope that forms images of a specimen using a physical probe that scans over the surface of the specimen. The scanned probe may react with the specimen through a variety of physical forces, including mechanical contact forces, van der Waals forces, capillary forces, chemical bonding forces, electrostatic forces, and magnetic forces. SPMs measure different forces to determine different properties of the specimen, and display the sample properties on an image.

Types of SPMs include the scanning tunneling microscope (STM), which measures conducting sample, and the atomic force microscope (AFM), which can measure various properties of non-conductive sample. AFMs are well known and are described, for example, in U.S. Pat. No. 6,185,991 to Hong et al. for "Method and Apparatus for Measuring Mechanical and Electrical Characteristics of a Surface Using Electrostatic Force Modulation Microscopy Which Operates in Contact Mode", which is hereby incorporated by reference. An AFM can operate in a contact mode, a tapping mode, or a non-contact mode.

U.S. Pat. No. 6,951,130 to Hare, et al, issued Oct. 4, 2005 and titled "Software Synchronization of Multiple Scanning Probes," which is commonly owned by the present assignee, describes a method and apparatus for scanning multiple scanning probe microscopes in close proximity. This allows the system to scan overlapping scan areas at the same time while avoiding collision. The techniques therein provide drive signals to a first Atomic Force Microscope (AFM) and calculated drive signals to additional AFMs based on the first drive signals and the relative position of the additional AFMs to the first AFM for consistent spaced motion. Scanning and Failure Analysis (FA) probing of multiple feature of interest using multiple APMs allows for reduced time for locating FA features to set up measurements. This prior patent is hereby incorporated by reference for all purposes.

When an AFM is operated in a mode to detect electrostatic force, it is referred to as an electrostatic force microscope (EFM). The EFM is a type of vibrating, non-contact AFM in which a force generated by applying an electrical potential difference between the probe tip and the sample is measured. An EFM is described, for example, in P. Girard, "Electrostatic Force Microscopy: Principles and Some Applications to Semiconductors," Nanotechnology 12, 485 (2001). As described in Girard, a voltage difference between a sample and an AFM tip creates a force proportional to the change in capacitance with probe height and the square of the potential difference. U.S. Publication No. 20160231353, by Erickson et al., describes a scanning probe microscope includes a scanning probe and one or more additional local-potential-driving probes that provide one or more local electrical potentials on a nanometer scale structure on the sample. The local-potential-driving probes may provide a fixed potential, an alternating potential, or a combination of both in order to tailor the local electrical field distribution for maximum sensitivity and selectivity when measurement are performed by the scanning probe. By driving the potential at a local feature rather than through the bulk sample, the local feature can be differentiated on a potential map from neighboring features, which allows for a single line among closely spaced lines to be identified and allows for imaging using fainter signals, such as those from subsurface features. This is particularly useful to identify circuit defects.

As semiconductor circuits get smaller and the metal lines get closer together. The "pitch," or distance between metal lines in modern integrated circuits varies with the fabrication process, but can be typically less than 100 nm, less than 80 nm, and even less than 40 nm. As the pitch becomes smaller in each new generation of fabrication processes, it becomes more difficult, time consuming, and labor intensive to calibrate a multi-tip AFM system for scanning and probing with probe tips at very close proximity. What is needed are improved systems and methods for operating multi-tip AFM probes to increase efficiency, precision, and throughput of such systems.

SUMMARY OF THE INVENTION

The present invention teaches a new approach to the calibration and scanning of multiple AFM probe heads used employed together for synchronous scanning. An automated calibration process is provided employing scan data from multiple AFM probe heads to automatically calibrate the system and position the probe heads at relative offset positions that are successively closer and more precise. Multiple heads are scanned simultaneously and synchronously to produce scan images, which are automatically evaluated to recognize a common feature in the scan images. From this, a relative offset of the images is calculated and the true position of each probe tip may be known. Using this knowledge, a position offset is applied to bring the probe tips closer together at a desired spatial relationship. The techniques may be repeated at two or more levels varying from coarse to fine, and may be repeated after probing or movement to a new region of interest.

Other aspects of the invention include computer readable media containing programming instructions for accomplishing the processes herein. Still further aspects involve a system including multiple AFM assemblies, control electronics, and programming for managing system workflow and conducting the processes described herein.

The various aspects provide the benefits of much greater efficiency and accuracy in calibrating and using AFM systems with multiple scanning and probing tips scanned synchronously. The improved calibration also provides ability to perform lengthy calibration procedures required to bring tips into very close proximity for synchronous scanning with multiple tips of samples with very small feature sizes.

According to one aspect of the invention, a method is provided for operating an atomic force microscope (AFM) system under control of a processor, the AFM system including multiple AFM assemblies positioned for scanning a common sample area, each having a cantilever supporting a probe head with at least one tip. The method includes positioning the multiple AFM probe heads with their respective tips at a first predetermined relationship to each other. Then it automatically performing a first scan including scanning the tips in synchronicity across a surface and creating, for each tip, a scan image. The method automatically processes the scan images to recognize a feature appearing in all the scan images having desired spatial characteristics. From this, it automatically designates the recognized feature as a common feature and overlays the scan images together to determine a relative offset for each of the scanning tips. Based on the relative offset, the method automatically positions the scan tips at a second predetermined relationship to each other, the second relationship placing the tips relatively closer to each other than the first relationship. After positioning the scan tips at the second predetermined relationship, automatically performing a region of interest scan including scanning the tips in synchronicity across a surface and creating, for each tip, a scan image.

In some embodiments, the desired spatial characteristics of the recognized feature include a designated minimum feature pitch between two feature structures. The second predetermined relationship may also have greater precision than the first predetermined relationship with regard to control of the position. The method may, after positioning the scan tips at the second predetermined relationship, automatically reconfigure the AFM system for scanning at an increased resolution.

In some embodiments, the second predetermined relationship places the tips along the circumference of an imaginary calibration circle. The calibration circle may be centered around the common feature of the first scan.

The method may be employed with an AFM system including multiple AFM assemblies, for example a number n of least two, three, four, or eight AFM assemblies.

The method may further include, before performing the region of interest scan, performing a second, fine probe reference scan which proceeds similarly to the coarse probe reference scan but repositions the probe tips at a closer proximity, for example positioning the probe tips along circumference of an imaginary fine calibration circle.

According to another aspect, the invention may be embodied as an atomic force microscope (AFM) system including at least three AFM assemblies positioned for scanning a common sample area, each including a cantilever supporting a probe head with at least one tip, a 3-axis actuator mechanically coupled to the cantilever, control electronics operably coupled to a feedback position sensor for providing calibrated scanning of the probe head, and a deflection sensor positioned to sense deflection of the cantilever. The system includes an electronic controller coupled to the control electronics of the AFM assemblies, and operable to generate a scan waveform for each respective AFM assembly. Coupled to the controller is tangible, non-transitory computer readable memory coupled to the electronic controller and containing program code executable by the electronic controller performing the methods herein.

According to another aspect, the invention may be embodied as program code stored on computer readable media executable by a controller to operate an atomic force microscope (AFM) system, the system having at least three AFM assemblies positioned for scanning a common sample area, the program product containing program code executable for performing the methods described herein.

Other objects and advantages appear hereinafter in the following description and claims. The accompanying drawings show, for example purposes without limiting the scope of the present invention or the appended claims, certain practical embodiments of the present invention.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF EXAMPLE EMBODIMENTS

Several variations of the subject invention are now described in order to illustrate the salient features of the invention. The examples are chosen to illustrate how the beneficial features of invention, including the use of automated calibration processes for multiple scanning AFM heads employed together, facilitates improvements for processing and automating scanning and probing of samples. Not all of the innovative elements are employed in each of the illustrated examples.

Figure 1:
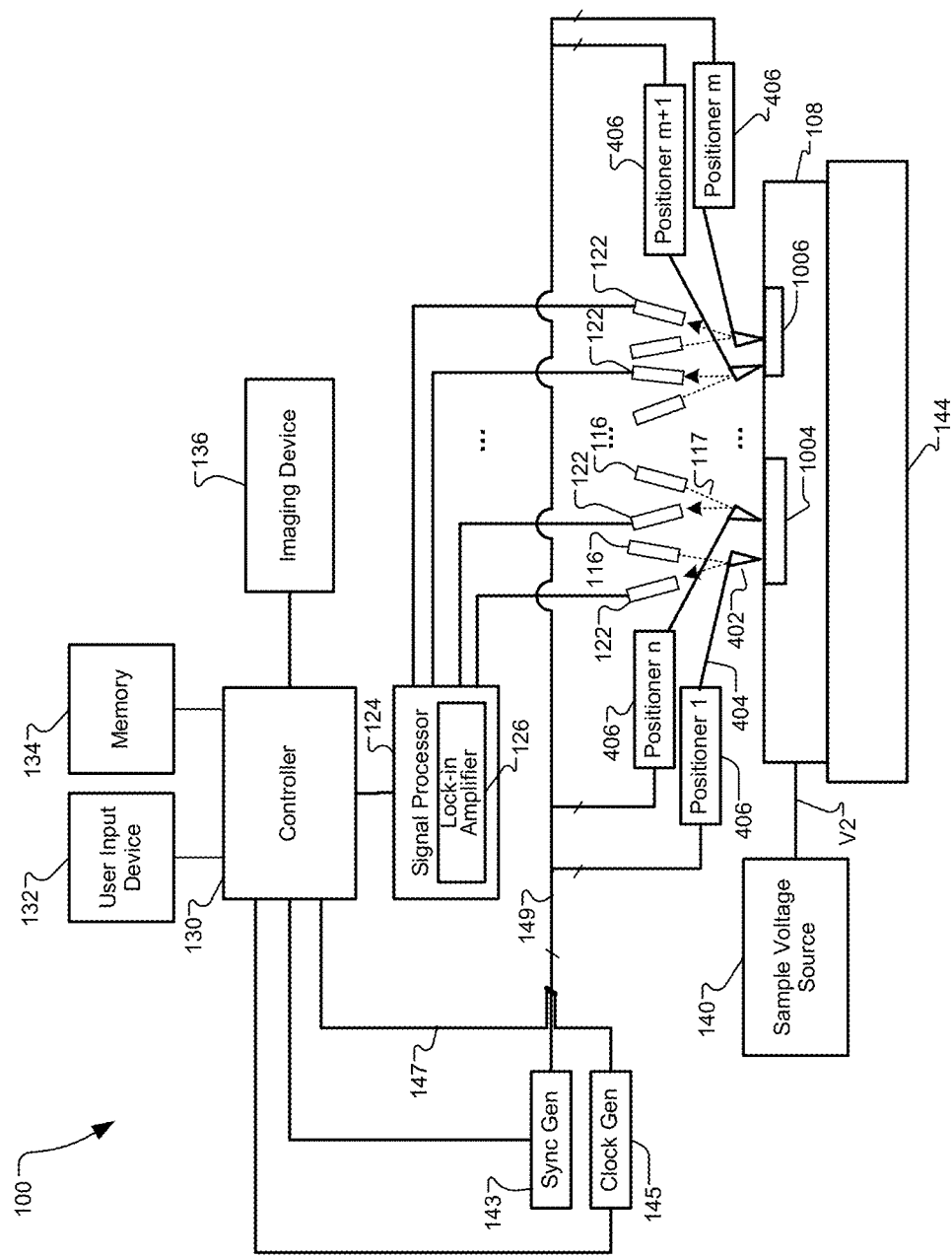
FIG. 1 is a diagram view of a multi-probe AFM system that may be employed with some embodiments of the present invention.

FIG. 1 shows an AFM system 100 that includes a multiple probe tips 402 at the distal end of a cantilevers 404. Each probe tip has an associated AFM assembly each including a cantilever 404 supporting a probe head with at least one tip 402, a positioner 406 typically including a 3-axis actuator mechanically coupled to the cantilever 406, control electronics operably coupled to a feedback position sensor for providing calibrated scanning of the probe head, and a deflection sensor 122, preferably a photon detector, positioned to sense deflection of the cantilever Preferably each deflection sensor 122 detects a reflected laser signal 117 from an associate laser 116 pointing toward a posterior face of the probe head. Positioners 406, typically comprising coarse adjustment motors and fine adjustment piezoelectric actuators, scan the cantilevers 404 with the probe tip 402 across the surface of a sample 108, which includes features to be measured and probed, such as a nanoscale structures 1004 and 1006. Cantilever 404 acts like a spring. When cantilever 404 is deflected and released, it oscillates at a resonant frequency.

The depicted system in FIG. 1 includes multiple AFM assemblies, such as 4, 5 or 8, other suitable number n of assemblies as shown to provide a desired number of probe heads that may be scanned simultaneously. Preferably the AFM assemblies 1-n, as shown by the labelled positioners 1-n, are arranged in a circular position such that each cantilever 404 projects toward the desired scanning area from a different angle, although in some versions one or more cantilevers may be arranged higher than others, particularly in cases where selected probe heads are employed to apply voltage to structures on the sample 104 for electrical measurements. A sync gen signal circuit 143 generates a synchronization signal applied to each positioner to enable synchronization of movement. A common clock signal is also provided by clock gen circuit 145. Position command signals 147 from controller 130 also are routed to each positioner 406. These signals are shown as a bus 149 for simplicity in the drawing but may be routed or coupled with separate wires or signal paths. A suitable method of synchronous command and control of the head scanning in close proximity is described in U.S. Pat. No. 6,951,130 to Hare, et al, issued Oct. 4, 2005 and titled "Software Synchronization of Multiple Scanning Probes," which is commonly owned by the present assignee. Use of this method is preferred and it will not be further described in the present application. Other suitable methods of synchronous scanning may be used.

During the scanning of each probe tip, forces between the sample 108 and the cantilevers 404 with probe tip 402 cause a deflection of cantilever 404. A laser 116 directs a beam of light 117 towards a reflective surface on cantilever 404 near tip 402, and the reflected light 120 is detected by a position sensitive photon detector 122, which produces an electrical output signal corresponding to the position of the tip. The output signal from each detector 122 is processed by a signal processor 124 to determine the deflection of tip 402 over time. The cantilever oscillation, and therefore the signal output from photon detector 122, is essential sinusoidal and characterized by a frequency, amplitude, and phase. The various forces between the probe and the sample will affect these sinusoidal properties. Signal processor 124 may include one or more lock-in amplifiers 126 to extract signals corresponding to specific frequencies from other signals and noise present in the output signal from detector 122. In various applications, the amplitude, frequency, and/or phase of the cantilever vibration are detected and used to determine a local property of the sample.

A controller 130 controls AFM system 100 in accordance with instructions input through user interface 132 or in accordance with program instructions stored in computer memory 134. Controller 130 also controls an imaging device 136, such as a computer display screen, to display sample images formed by AFM system 100. In some applications, controller 130 uses the tip deflection to provide feedback to positioner 406 to raise or lower the cantilever 404 to maintain a constant distance between the probe tip 402 and the sample surface. By "distance between the probe tip and the sample surface" is meant the distance from the local sample surface below the probe to the rest position of the probe. In other applications, the probes are scanned in a straight line, and so the height of the probe about the sample surface varies as the local surface topography.

Figure 9:
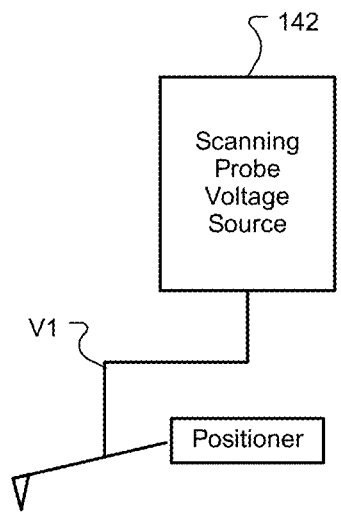
FIG. 9 is a diagram of a voltage source applied to a scanning probe.

A sample voltage source 140 may be included to apply a dc bias voltage, an ac voltage, or a combination of both to sample 108. As used herein, applying a dc bias voltage may include applying a zero voltage, that is, grounding an element. FIG. 9 shows a scanning probe voltage V1 connection which may be employed with one, several, or all of the 1-n scanning probes in various embodiments. A scanning probe voltage source 142 can apply a dc bias voltage, an ac voltage, or both to tip 402.

When the AFM is being used to measure voltages, the sample may optionally positioned within a guard chuck which secures the sample and partly surrounds it with a conductive material to reduce stray electrical potentials that can affect the electrical measurements. The potential from sample voltage source 140 can be applied to the bulk sample through the guard chuck, or through a conventional chuck. The potential can also be applied to contact pads on the sample.

Figure 10:
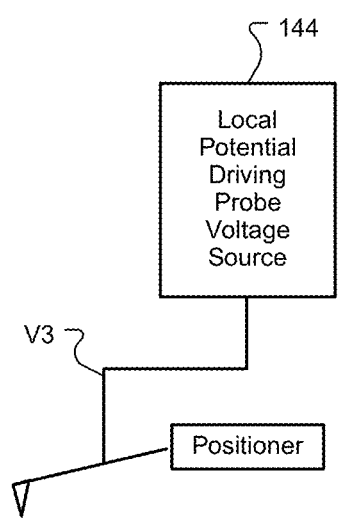
FIG. 10 is a diagram of a local potential driving probe voltage source connection.

AFM 100 system of FIG. 1 may include, for certain scans, a voltage V1 applied to a particular probe tip 402 and a potential V2 is applied to the sample 108. While a user may desire to apply voltage V2 to the nanoscale structure 110, various factors affect the electrical properties at nanoscale structure 110, which results in intermediate potentials on nanometer scale structure 110. FIG. 10 shows a local potential driving probe voltage source 144 providing a voltage V3 connected to the probe tip which may be employed with one, several, or all of the 1-n scanning probes in various embodiments. Such a connection may be employed to apply desired voltages to the tips to obtain desired test conditions during probing.

Controller 130 may be a dedicated computer processor in specialized hardware having control interfaces for system 100, or may be a part of a standard laboratory personal computer, and is typically coupled to at least some form of memory 134 including one or more computer-readable media. Such computer-readable media, which may include both volatile and nonvolatile media, removable and non-removable media, may be any available medium that can be accessed by controller 130. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by controller 130. Memory 134 includes program memory can include computer storage media in the form of removable and/or non-removable, volatile and/or nonvolatile memory and can provide storage of computer-readable instructions, data structures, program modules and other data. Generally, controller 130 is programmed by means of instructions stored at different times in the various computer-readable storage media. The invention described herein includes these and other various types of computer-readable storage media when such media contain instructions or programs for implementing the steps described below in conjunction with a microprocessor or other data processor. The invention may also include the computer processor itself when programmed according to the methods and techniques described herein.

Figure 2:
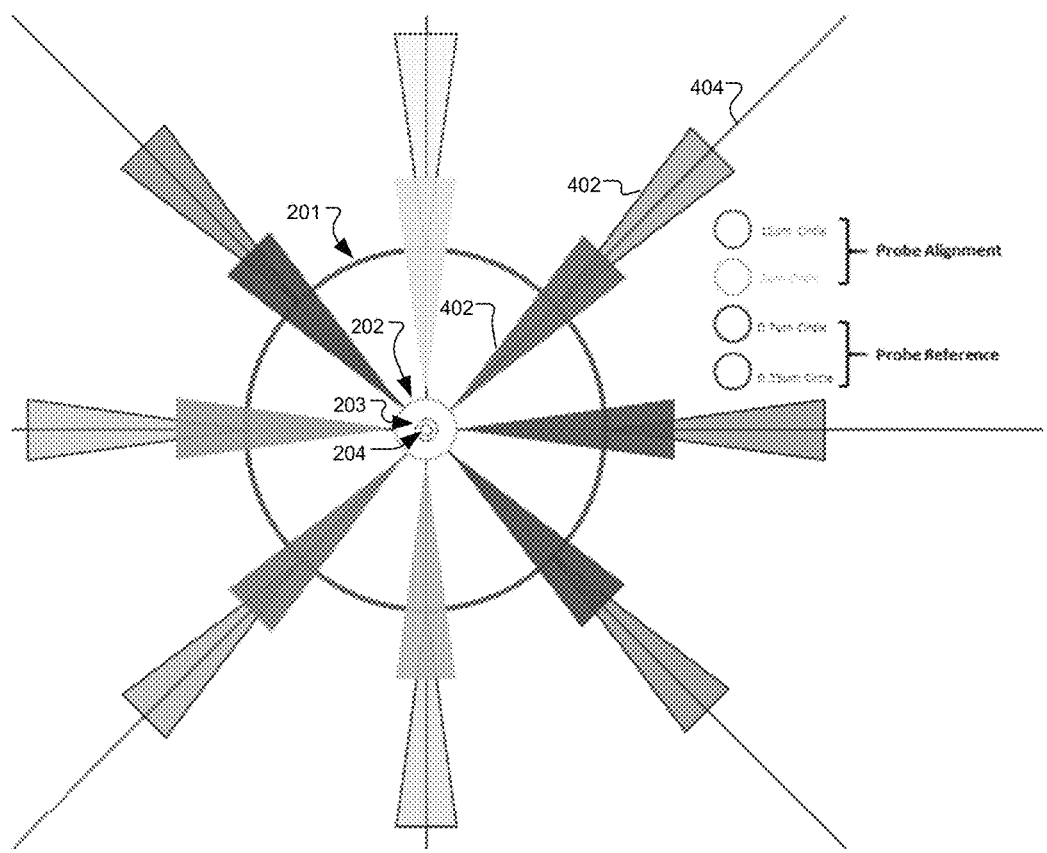
FIG. 2 is a diagram showing probe tip locations with relative to several reference circles employed according to some embodiments of the present invention.

FIG. 2 is a diagram showing probe tip locations with relative to several reference circles employed according to some embodiments of the present invention. The diagram shows eight probe tips 402 arranged around a sample area inside which they are calibrated according to the techniques herein. Depicted are imaginary circles 201-204 employed for calibration. A shaded version of the tips 402 shows them repositioned from a first arrangement along circle 201 to a second arrangement along circle 202. The circles 201-204 used in this example process are 12 um, 2 um, 0.7 um, and 0.35 um, however this is merely one example and other sizes may be used. The automated calibration process is described with respect to the flowcharts and drawings below. The process involves an automatic positioning and adjustment, first with optical guidance for the alignment and then with scanning data acquired from the scanning heads themselves for coarse and fine calibration. The calibration process, the preferred version referred to as "4 circles" because of the successive calibration to a more precise position around circles as depicted, may involve several phases using successive coarse and fine calibration. Other versions may use more or less circles, and other arrangements besides circular arrangements may be used, such as rectangular, diamond, oval, or other suitable relative position arrangements of the multiple probe tips.

Figure 3:
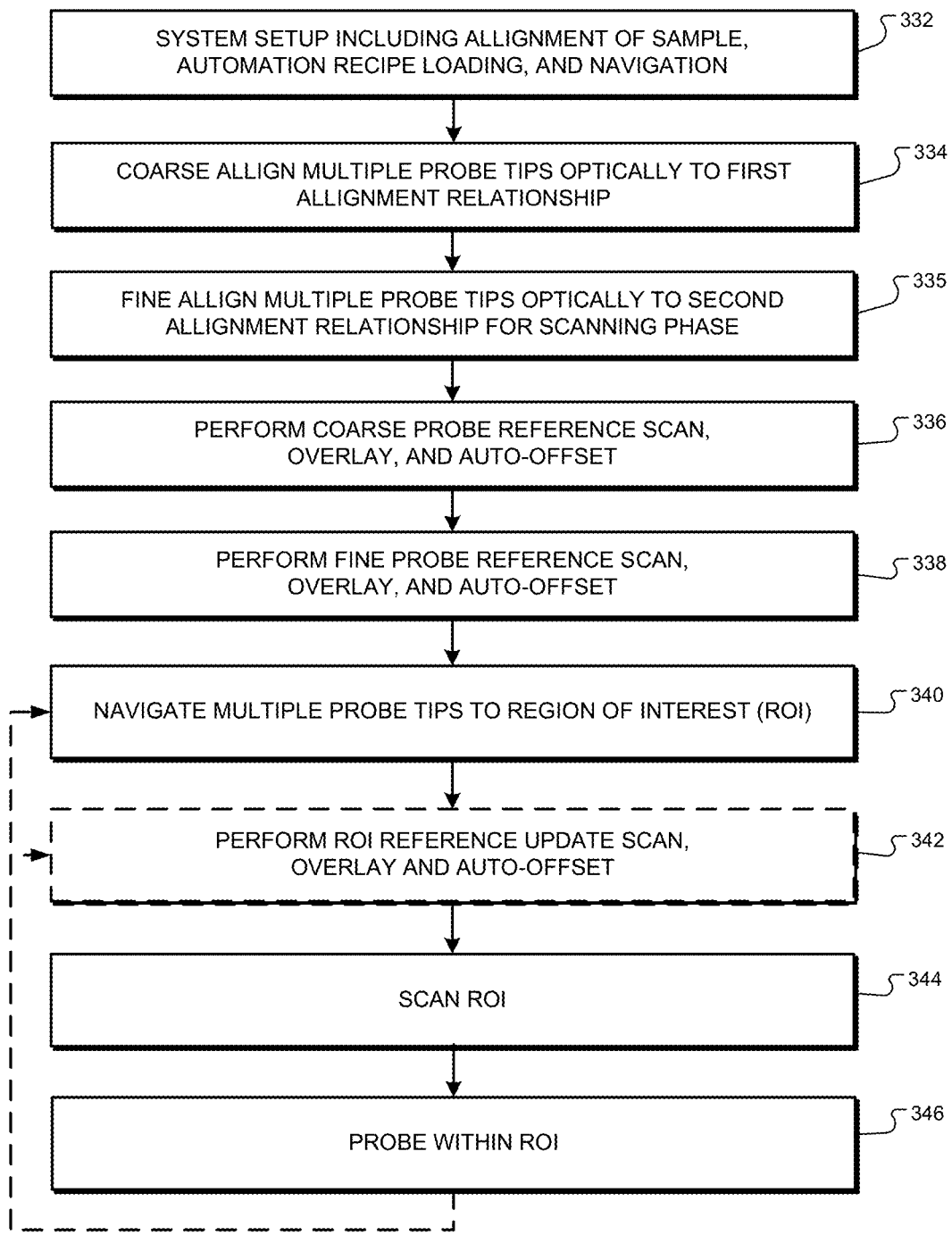
FIG. 3 is a flowchart of a general process for setup, calibration, scanning, and probing with an AFM according to some embodiments.

FIG. 3 is a flowchart of a general process for setup, calibration, scanning, and probing with an AFM according to some embodiments. Referring to FIGS. 2 and 3, an overview of a preferred process for scanning and probing a particular sample device such as a semiconductor SRAM device, is shown. The process starts at block 332 with the system setup which includes covers all the alignment, navigation, and recipe loading necessary for a user to measure the sample. The final steps of setup involve (block 334) optically aligning probe tips to with movement from coarse adjustment motors of positioners 406 be close to each other, preferably aligned along an imaginary circle such as circle 201. Then the process uses the fine adjustment piezo electric actuators of positioners 406 to, under optical guidance, to move the probe tips to circle 202 in a closer arrangement. This may be performed automatically through guidance with feedback from an optical imaging system such as imaging device 136. Next the process enters a scanning phase in which the probe tips are calibrated and moved to a closer arrangement to each other, and the area to be probed is scanned. This stars at block 336, where the process automatically performs a coarse probe reference scan, scan image overlay, and an auto-offset as further described with respect to FIG. 4. The auto-offset results in a move from circle 202 to circle 203, for example. Next at block 338, the process performs a fine probe reference scan, scan image overlay, and auto-offset to bring the probe tips into an even closer calibration, such as around an even smaller circle such as circle 204. From this point, the multiple probe tips are navigated synchronously (block 133) to a desired region of interest at block 340. For the very first scan of a particular desired ROI, the fine calibration of block 338 may be performed at the ROI and no movement or only small movement within the ROI is required at block 340. Subsequent scans at other regions may require larger movements relative to the sample. At block 342, the process may automatically perform a ROI reference update to re-calibrate the probe tips at the desired relative position such as aligned at an imaginary circle 204. Next at block 344, the process automatically conducts a scan of the ROI area. The scan data is then employed at block 346 to probe desired features within the ROI according to a test plan, which may involve applying scanning probe voltages and local potential voltages on desired probe heads. This step may involve the user is actively landing probes on feature, acquiring IV data, and designating new probe positions, or may involve an automated test recipe performing such steps. The probing may follow any known probing process suitable for measuring and testing the desired features, such as EFM probing, and will not be described in detail herein.

After probing, the process may go to block 340 to navigate to a new ROI, or may remain in the same ROI and go to block 342 to perform a reference ROI update scan to update the relative calibration of the multiple probe tips. Then more scanning and probing may be conducted until all desired features and tests have been probed.

Figure 4:
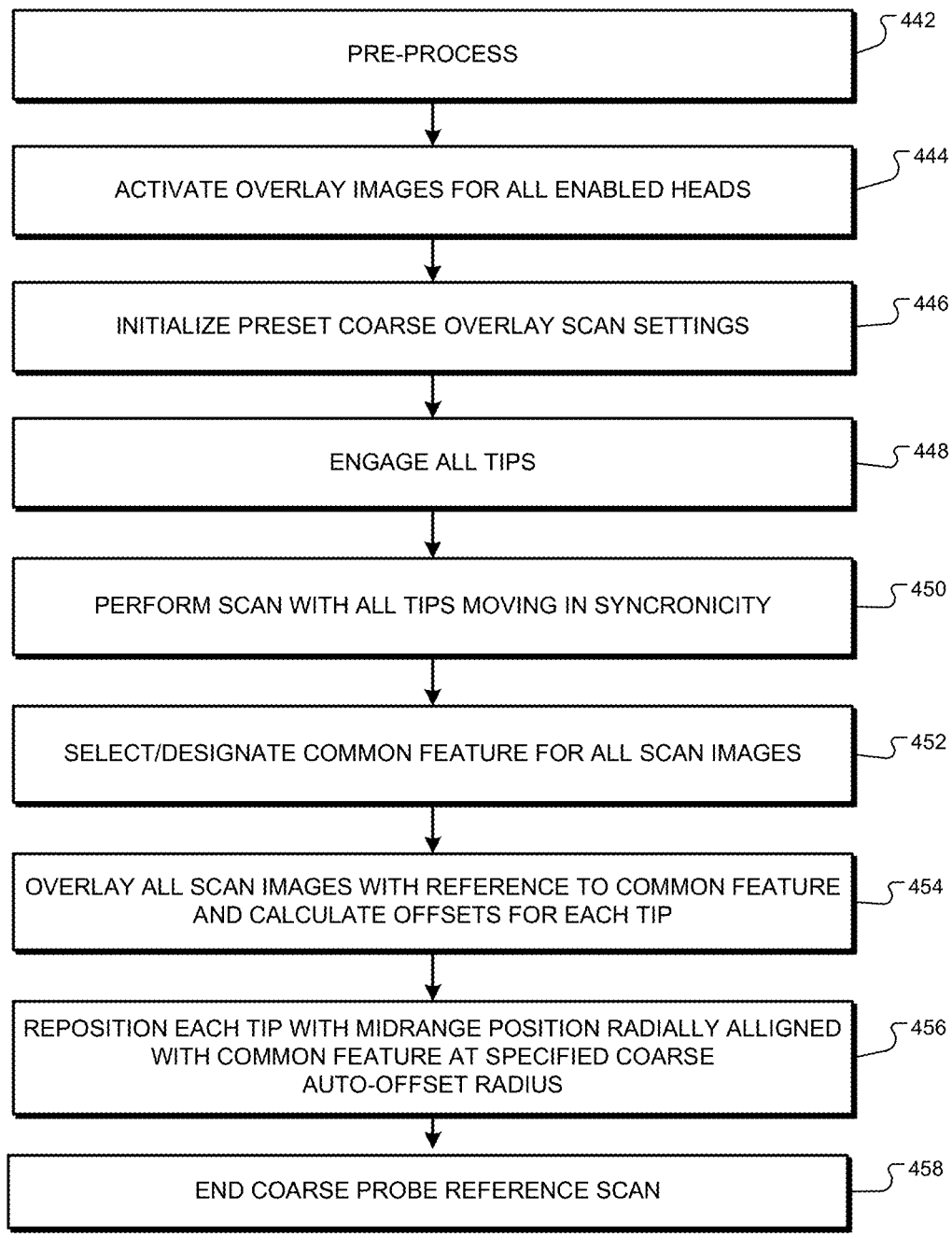
FIG. 4 is a flowchart of a coarse calibration process according to an example embodiment.

FIG. 4 is a flowchart of a coarse calibration process according to an example embodiment. The process is one version of a coarse reference scan of block 335 (FIG. 3), and is preferably conducted automatically under control of program code stored in memory 134 of controller 130. Generally the process provides a method of operating an atomic force microscope system under control of a processor, the AFM system including multiple AFM assemblies each having a cantilever supporting a probe head with at least one tip. The AFM system preferably includes at least four AFM assemblies, but may include any suitable number n as described above such as eight. The process begins at block 442 with the multiple AFM probe heads positioned with their respective tips 402 at a first predetermined relationship to each other, typically positioned through optical guidance in an arrangement such as around circle 202 of FIG. 2, or another suitable relative relationship as described above. At block 444, the process activates the overlay imaging capture for all the enabled heads, and activates preset coarse overlay scan settings that determine the size and resolution of the scan in each dimension, and the scan speed, at block 446. Next at block automatically engages all the positioners at block 448 and performs a first scan including scanning (block 450) the tips in synchronicity across a surface and creating a scan image for each tip from data scanned from the tip.

Figure 8:
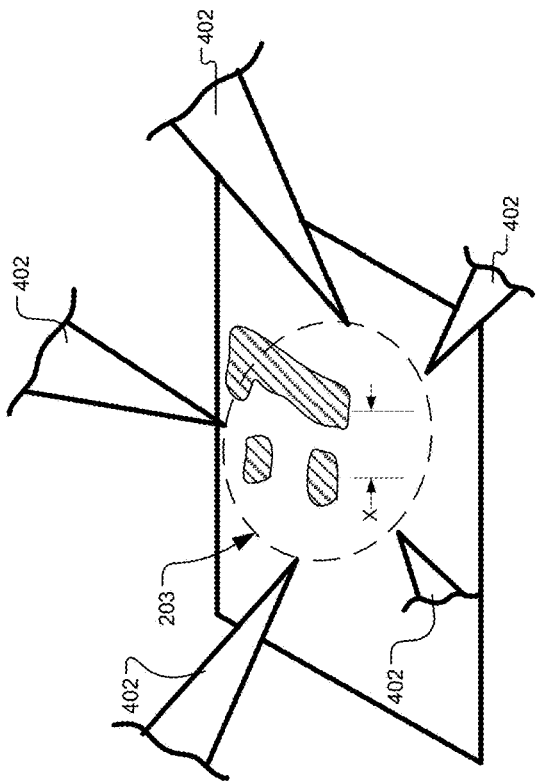
FIGS. 7-8 are a series of perspective diagrams of several AFM probe tips relative to a surface to be scanned.
Figure 7:
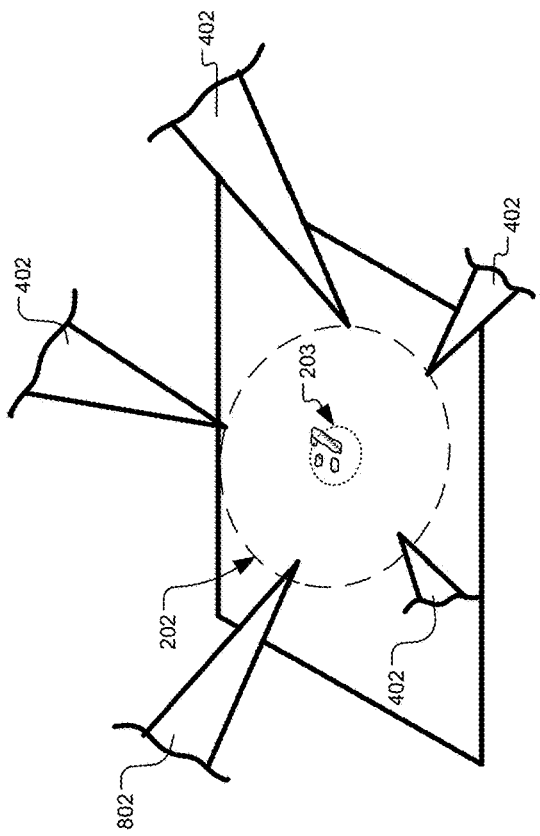

Next at block 452, the process automatically processes the scan images to recognize a feature appearing in all the scan images having desired spatial characteristics, and automatically selects or designates the recognized feature as a common feature all the scanned images. The feature may be predetermined or may be selected automatically according to suitable criteria, as further described below. In some versions of the process, the desired spatial characteristics of the recognized feature include a designated minimum feature pitch between two feature structures. Next at block 454, the process automatically overlays the scan images together to determine a relative offset for each of the scanning tips. This may be performed with a plane-fit filtering technique or other suitable cross-correlation technique for measuring an offset between similar, but not identical, images. Note that head sizes may vary based on uneven wear, and so scan image properties may be different between the various acquired scan images. Based on the relative offset, the process next automatically positions the scan tips at a second predetermined relationship to each other, the second relationship placing the tips relatively closer to each other than the first relationship, such as at circle 203 or another suitable relative relationship. The second predetermined relationship preferably has greater precision than the first predetermined relationship for not only a closer configuration of the tips, but a more highly calibrated group of scan tips. Then the coarse reference scan ends at block 458. Following, the process may proceed with a fine reference scan or if the coarse reference scan is sufficiently calibrated, may proceed with automatically performing a second scan of a region of interest including scanning the tips in synchronicity across a surface and creating, for each tip, a scan image for use in probing the region of interest. The process may further include, after positioning the scan tips at the second predetermined relationship, automatically reconfiguring the AFM system for scanning at an increased resolution. The second predetermined relationship may be a calibration circle that is centered around the common feature of the first scan. Such a relationship may be seen in the sequence of diagrams of FIGS. 7-8. FIG. 7 shows multiple probe tips 402 arranged as might be seen at the beginning of the coarse reference scan of block 450, around circle 202. Following the repositioning adjustment of block 456, the diagram of FIG. 8 shows the same tips moved closer together to the position along circle 203, centered around a selected common feature having a pitch of X as shown on the diagram.

Figure 5:
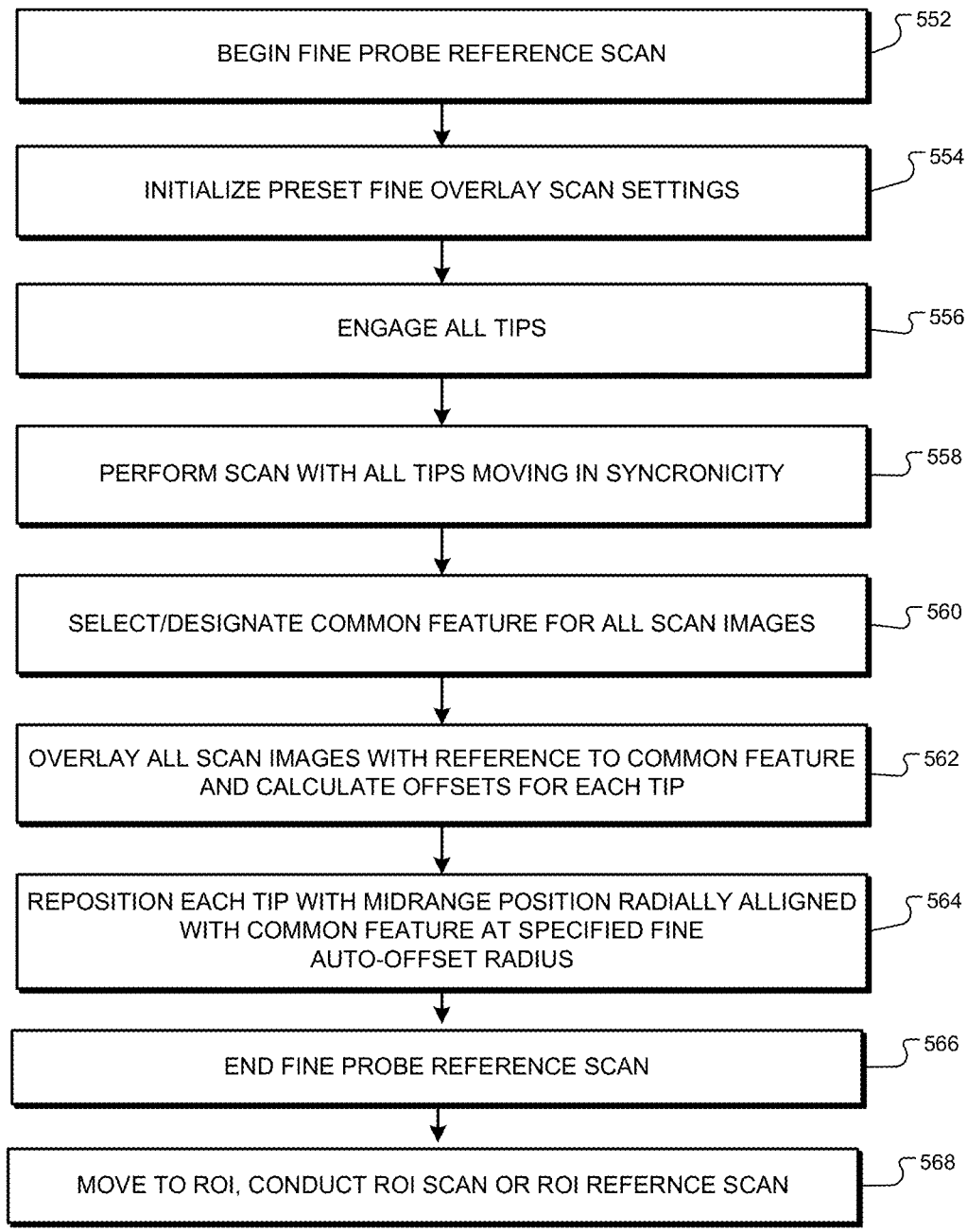
FIG. 5 is a flowchart of a fine calibration process according to an example embodiment.

FIG. 5 is a flowchart of a fine calibration process according to an example embodiment. As discussed with regard to FIG. 3, a coarse probe reference scan may be followed by a fine probe reference scan beginning at block 552. The process first initializes the scan settings for the fine overlay scan including scan size, resolution, and speed at block 554. Then at block 556 the process engages the scan tips and performs the second scan at block 558 moving all the tips together in synchronicity to acquire scan images from each. Next at block 560 automatically processes the scan images of the second scan to recognize a feature appearing in all the scan images having desired spatial characteristics, which may be the designated common feature of the first scan or another feature, and automatically designates the recognized feature of the second scan as a common feature. The automated image processing techniques discussed with respect to FIG. 4 may be used here as well. At block 562 the process automatically overlays the scan images of the second scan together to determine a relative offset for each of the scanning tips. The automated image processing techniques discussed with respect to FIG. 4 may be used here as well. Based on the relative offset, the process at block 564 automatically positions the scan tips at a third predetermined spatial relationship to each other, the third relationship placing the tips relatively closer to each other than the second relationship. As with the with the adjustment of the coarse reference scan, the third spatial relationship is preferably a circle such as circle 504 with a specified radius centered at a designated point with regard to the common feature. The circle may have a diameter of 0.35 um or less, for example. Other suitable positions and arrangements may, of course, be used. The third predetermined relationship typically has greater precision than the second predetermined relationship, resulting in a closer tip position with improved calibration after the fine reference scan adjustment of block 564. The process may also further include, after positioning the scan tips at the third predetermined relationship, automatically reconfiguring the AFM system for scanning at an increased resolution or scanning at a different desired scan resolution than that used in the fine reference scan of block 558.

As discussed with regard to FIG. 3, after the fine reference scan the process at block 568 may include moving to a ROI and conducting an ROI reference update scan, or may proceed to scan an ROI immediately if the calibration is sufficient. An ROI reference scan typically proceeds similarly to the fine probe reference scan of FIG. 5, but may include resetting the probe tips from a probing mode to a suitable scanning mode such as tapping mode in scenarios in which the ROI reference scan is conducted after probing activities. An ROI reference scan will typically adjust the tip positions similarly to the adjustment of made for the fine reference scan, for example to a circular arrangement along the circumference of a 0.35 um circle. In some cases, an ROI reference scan may employ a differently shaped arrangement than a calibration scan.

Further, in some cases a third automatic reference scan may be employed after the fine reference scan to achieve an even smaller separation of the probe tips, depending on the system parameters such as tip size, desired scan resolution, and the precision with which the piezo-electric positioners 406 are controllable during movement. For example when system 100 is employed to scan semiconductor features from a 10 nm or smaller process, the fine calibration circle size of 350 nm may be too large for a particular desired high resolution scan, and third reference scan may be conducted to bring the tips to a closer relative spatial arrangement.

Using the techniques above, a 'four circles' calibration process may be automated entirely or almost entirely, allowing technicians to setup the process and then leave the system 100 to automatically conduct calibration through the reference scans. In some cases the coarse optical alignment step, for example positioning at circle 201 (block 334, FIG. 3) and fine optical alignment step positioning at circle 202 (block 335) may be performed manually by a user, or automatically under control of the program code using image recognition to guide the probe movement. Following this, the entire scanning phase including the reference scans and calibration position adjustments may be conducted with a completely automated workflow of the three probing reference operations, such that the user can walk away from the tool after initiating the process, allowing automation and much improved efficiency of calibration and scanning processes that previously required manual operator control and direction. Each of the processes herein may therefore be controlled by program code executed by controller 130. In some cases, legacy systems with requiring entry of settings through a software interface may be upgraded by providing program code for auto-filling text boxes with pre-defined values (replacing the user typing into four different boxes), or replacing user clicks on buttons with auto-clicking buttons based upon the scripted process to enter setting such as those described below.

Table 1 below includes an example automated workflow for conducting a scanning phase including three calibration adjustments. With regard to the preferred embodiment diagrammed in FIG. 2, the setting of Table 1 are employed for the scanning phase operations beginning after the alignment phase positions the scan tips along circle 202.

TABLE 1

Example Automated Workflow

| Step | Tasks |
|---|---|
| Overlay Coarse Probe Reference | |
| 1) Apply presets for Overlay Coarse scan. | 1) System activates overlay images for all enabled heads<br>2) System sets presets for overlay scan (7 × 7 um, @7 um/sec, 1000 × 100)<br>3) System engages all tips<br>4) System begins scan for all tips (1x scan)<br>5) System designates common features for all heads<br>6) System auto-maps all heads images to each other |
| 2) Auto-Offset Overlay Coarse | 1) System repositions probe tip offsets such that midrange position of tips are radially aligned with common feature at specified Auto-Offset Radius of 0.7 um radius |
| Overlay Fine Probe Reference | |
| 3) Apply presets for Overlay Fine scan | 1) System applies presets to scan size, scan speed, and scan resolution.<br>2) 2 um × 2 um<br>3) 3 um/sec<br>4) 1000 × 100<br>5) engages tips and starts scan<br>6) System designates common features for all heads<br>7) System auto-maps all heads images to each other |
| 4) Auto-Offset Overlay Fine | 1) System repositions probe tip offsets such that midrange position of tips are radially aligned with common feature at specified Auto-Offset Radius of 0.35 um radius |
| ROI Probe Reference Update | |
| 1) User Navigates to ROI OR 1) User Elects to rescan ROI | 1) User moves the SNAP stage to locate the new region to scan. |
| 2) Apply presets for ROI scanning | 1) System applies presets to feedback mode, scan size, scan speed, and scan resolution.<br>2) 1.5 um × 1.5 um<br>3) 3 um/sec<br>4) 1000 × 100<br>5) Place heads in Tapping Mode<br>6) engages tips and starts scan<br>7) System designates common features for all heads<br>8) System auto-maps all heads images to each other |
| 3) Auto-Offset ROI | 1) System repositions probe tip offsets such that midrange position of tips are radially aligned with common feature at specified Auto-Offset Radius of 0.35 um radius |

While these example setting are provided, this is not limiting and any suitable settings may be employed for the sizes, resolutions, speed, and the sizes of calibration circles or other virtual shapes used to align the probe tips. For example, the sizes of circles 201-204 in FIG. 2 may vary, but typically will keep their approximate relative size relationships. For semiconductor samples with smaller features, the sizes may shrink, and may grow to examine larger feature sizes.

Figure 6:
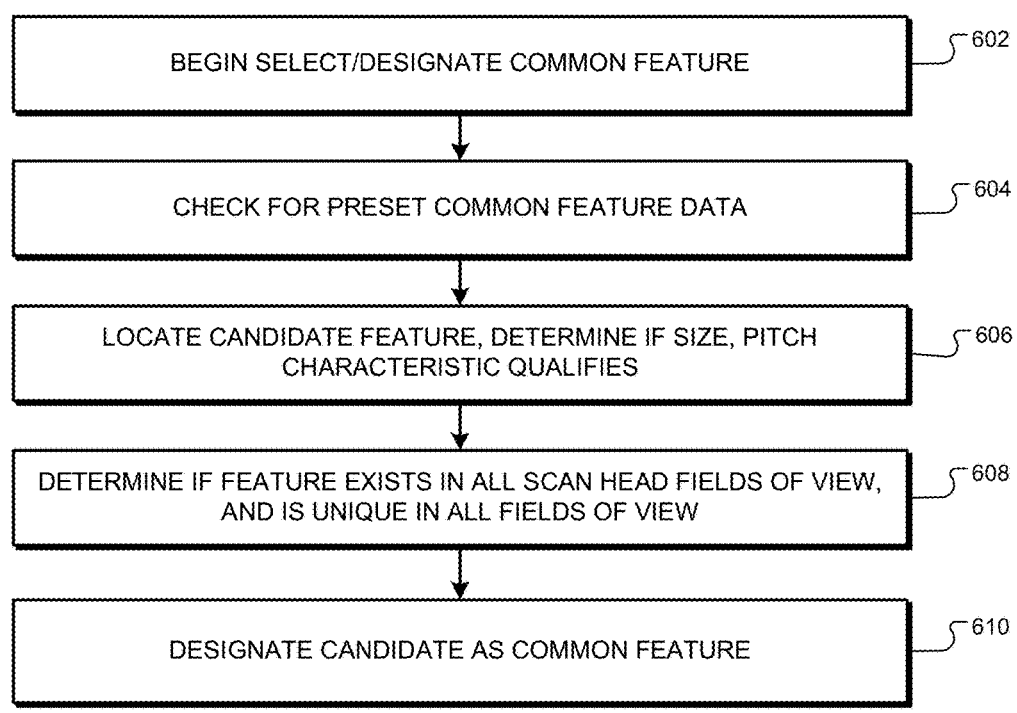
FIG. 6 is a flowchart of a process for selecting a common feature according to some embodiments.

FIG. 6 is a flowchart of a process for selecting a common feature according to some embodiments. In some cases a known or expected common feature may be selected as part of the recipe or process design to aid in automation, while in other cases the system may automatically select a feature according to the depicted process based on criteria specified in the recipe (block 604) for characteristics of the common feature. Feature pitch, center to center spacing, is preferable to use as one of the selection criteria because scan tips 402 tend to dull over time at uneven rates over the different tips 402, resulting in tips of different sharpness or dullness. Therefore feature sizes may not be an adequate characteristic to employ in the calibration processes described herein because a duller tip may result in measuring a larger size of a particular feature. Generally as depicted at block 608 the common feature should be unique and present in all the scanned images acquired for a reference scan.

Figure 11:
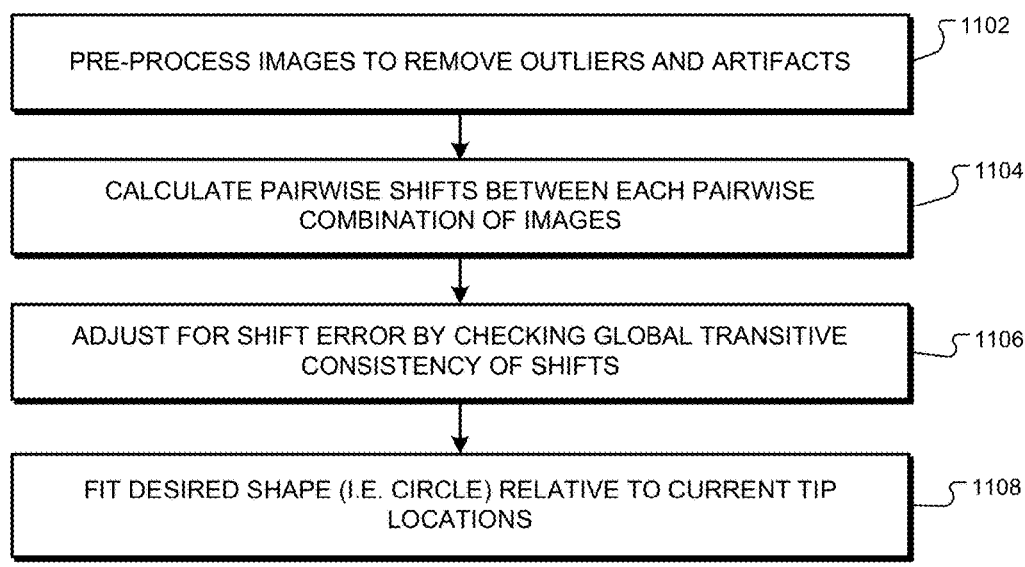
FIG. 11 is a summary flowchart for another process of overlaying and processing scanned images according to one or more example embodiments.

FIG. 11 is a summary flowchart for another process of overlaying and processing scanned images according to one or more example embodiments. This flowchart depicts a sequence of algorithms or processes that may be applied in order to accomplish the overlay and auto-offset and adjustment portions of the coarse, fine, or update scans (for example blocks 336, 338, or 342 of FIG. 3) in one or more embodiments. The process is typically performed by the controller 130 (FIG. 1) executing program code stored in memory, but may also be performed by suitable computer or processor, for example a graphics co-processor or graphics card or a networked cloud computing processor, coupled to the controller 130 and executing program code from its own memory in order to speed the processing. Each block of FIG. 11 may be accomplished with different specific algorithms processes, providing a suite of algorithms from which specific solutions may be designed to enable localization of multiple scanning AFM tips in fixed spatial offset relationships to each other and to a global coordinate system with very high accuracy. In existing solutions, such localization involves having the user visually select a common location in overlapping scans from all of the AFM tips. The present invention provides automated procedures to perform this process accurately without using a standard target, thus allowing the automation of overlay and auto-offset on a variety customer's sample directly. An overview of the process is depicted in FIG. 11, with more detailed examples for various steps described with regard to the following figures.

Beginning at block 1102, it is assumed that the tips have been arranged in a desired arrangement such as at the circumference of a circle approximately 2 microns in radius by the user visually, or automatically via feedback through image recognition, using the optical camera on the tool. The goal of the overlay and auto-offset is generally to subsequently go beyond reasonably achievable optical accuracy by using AFM scanning to achieve closer and more precise offsets for the AFM tips in iterative overlay and auto-offset steps, for example first to a 0.7 microns radius and then to a 0.35 microns radius circular positioning of all tips. This is achieved by scanning with each tip over an overlapping area with at least one unique feature that is common, i.e. partially visible in all of the overlapping scans, and employing the scan data in the process of FIG. 11. Generally the inputs of the process at block 1102 are three or more of such scanned images, one from each head (and therefore one from each tip) scanning overlapping areas with at least one unique section of that area showing in each image. The process at block 1102 then pre-processes the images to remove outlier data values and scan artifacts. This provides as an output the same images with the outlier data and scan artifacts removed, for example according to one or more of the algorithms described with regard to FIG. 12.

Next at block 1104, the process calculates a set of pairwise shifts between each pairwise combination of images (and therefore tips which acquired the respective images). Each pair of images has a subset of image data that is overlapping so the algorithm(s) for this stage are provided to accurately calculate the translation in X and Y axes to align these overlapping subsets, as further described below. Next at block 1106 the process adjusts for noise and error in the offset measurements by checking for a transitive consistency in the shifts produced by block 1104. This block is performed to reduce the error in each measurement and provides a global coordinate system for all the tip locations as further described below. Finally at block 1108, the process employs the corrected shift locations and global coordinate system from block 1106 to produce the tip offset movements needed to move the tips to new locations to fit the desired shape, such as a circle, and moves the tips according to the offsets. The desired shape may be other suitable shapes such as a grid, oval, square, etc., as discussed above. At this point the overlay and auto-offset process is complete, and the tips can be navigated or scanned as desired, depending on whether the overlay/auto-offset process was a coarse, fine, or update process as discussed above.

Figure 12:
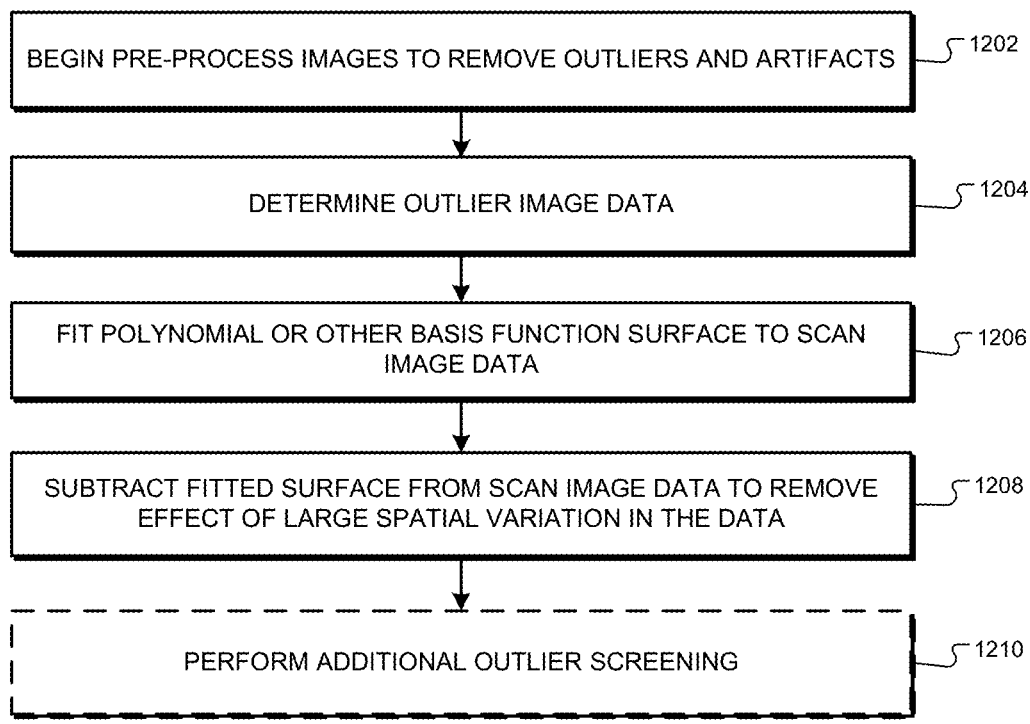
FIG. 12 is a flowchart of process or method for conducting the pre-processing block of FIG. 11 according to one or more example embodiments.

FIG. 12 is a flowchart of process or method for conducting the pre-processing block of FIG. 11 according to one or more example embodiments. Such AFM scan images typically require planar polynomial corrections, but the calculation of these corrections can be affected by typical AFM artifacts like particles, tip pickup and drop-off of particles and streaks caused by these particles. The output of the process of FIG. 12 is the scan images with outlier data adjusted and artifacts removed from the scan images.

Figure 13A:
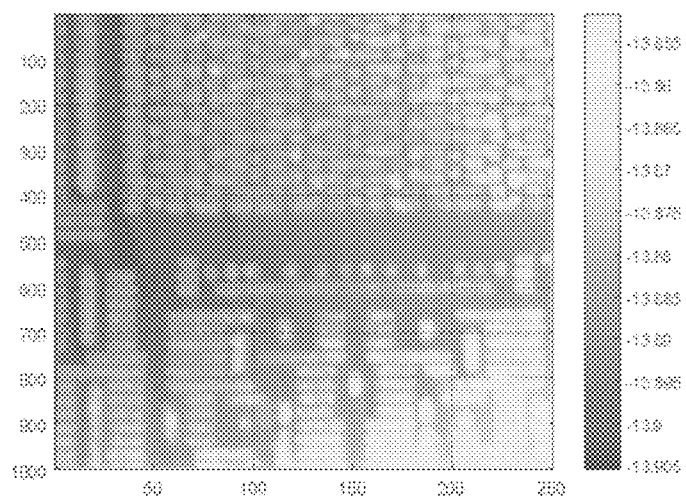
FIGS. 13A-C are a sequence of example scan images processed according to the method of FIG. 12.
Figure 13B:
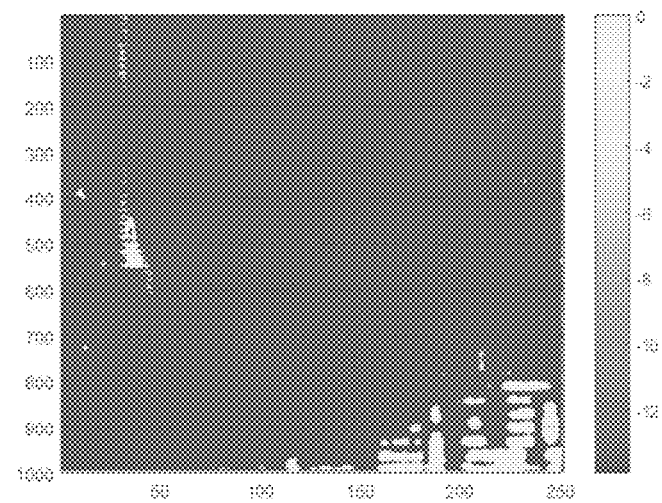
Figure 13C:
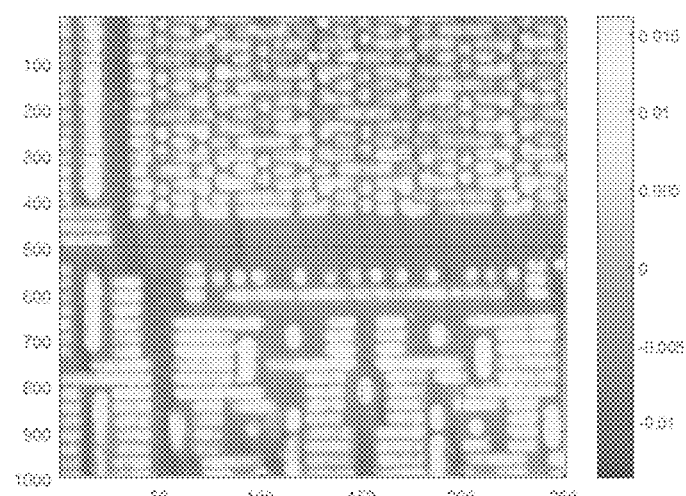

The process begins at block 1202 with the multiple partially overlapping scan images provided from a scan of the AFM tips. An example of such an image is shown in FIG. 13A. Next, at block 1204, the process for each scan image determines outlier data in the scan image by, for example, employing inter-quartile range based screening to flag outliers in the image data. FIG. 13B shows an example of outlier values identified from the image of FIG. 12A. Other forms of outlier detection can be used here as well. Next at block 1206, the process seeks to remove the effects of large scale variations in the data for example by removing overall planar effects up to third order and reduce the outlier image data to a calculated robust image data range. In a preferred version, the process fits a 2D polynomial of up to 3rd degree in each axis using polynomial regression. The degree of the polynomial is preferably limited to 3 in both X and Y, but other polynomial forms or other suitable functional forms could be used as a basis function. A least-squares fit is used in this version, but other methods of fitting may be used. Further, it is not necessary that a plane-fit be used since a line-wise correction may also be used. Then at block 1208 the process extracts the effect of large scale spatial variations in data by removing the resultant fitted surface from the data. FIG. 13C shows data from the image of FIG. 13A, adjusted by extracting a fitted surface as described. Next at block 1210 the process may optionally perform additional outlier screening such as applying localized filters for outlier areas, replacing outlier values with a local average of surrounding pixels, or other known techniques for adjusting outlier data points.

Figure 14:
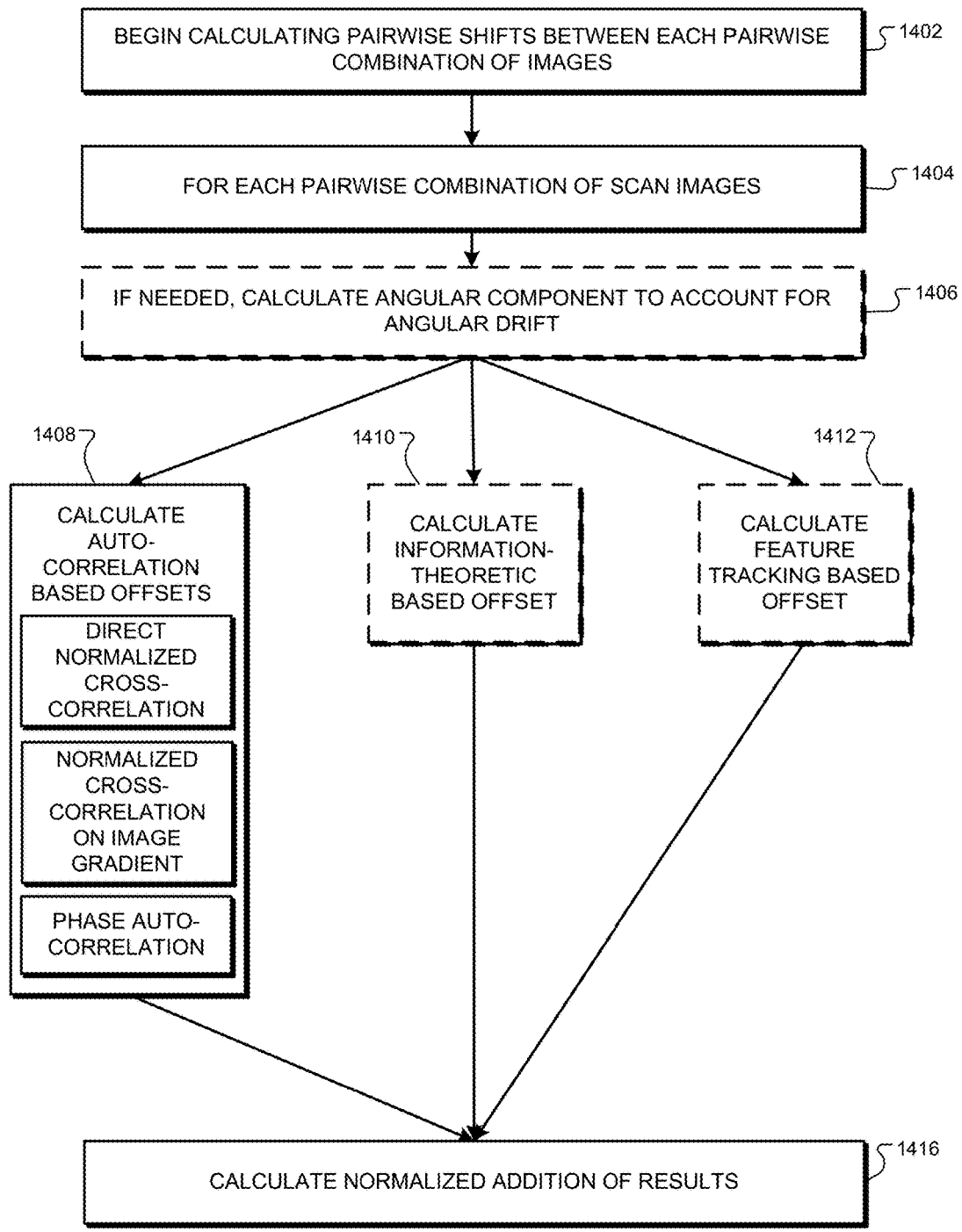
FIG. 14 is a flowchart of a process for calculating the pairwise shifts or offsets between pairs of scan images.

FIG. 14 is a flowchart of one example implementation of block 1106 of FIG. 11 for calculating the pairwise shifts or offsets between pairs of scan images. As depicted, several alternative algorithms may be employed for calculating the shifts in various embodiments of the invention, and results from different algorithms or calculations may be combined to improve accuracy. The process to calculate pairwise shifts between each pairwise combination of images (and therefore the AFM tips) begins at block 1402. As shown at block 1404, the process performs the calculation for each respective pair of images, which as discussed above have a subset of the image area that is overlapping, so the algorithm(s) for this stage need to accurately calculate the translation in X and Y axes to align these respective overlapping subsets. While the preferred version determines the shift or offset between all pairwise combinations, this is not limiting and some versions may determine shifts from less than all pairwise combinations. For example a designated image may be selected as a base reference and pairwise shifts calculated between that image and all other images. Or, an algorithm may be employed that combines all available images and calculate overall registration for all image. However, calculating the pairwise shifts between all pairwise combinations yields a method that is more robust to errors, noise, and sample drift effects than merely calculating a single relative set of shifts and making the offset adjustment based on those. These algorithms also are more robust to the effect of varying degrees and shapes of dilation of image features caused by variations in shape and size of the individual AFM tips being used for imaging. The process at block 1404 provides the scan images and a listing of all pairwise combinations of the images for processing. As set forth at block 1406, which is optional, in some rare cases there is an angular drift (rotation) of the sample during scanning that must be accounted for with an angular component included in calculating the offsets. Block 1406 checks for such an angular shift and, if it is detected, the following offset calculations must include determining such angular shift. This may be accounted for using appropriate versions of the offset calculations including passing the data through log-polar transformations, for example.

After block 1406, the process calculates one or more sets of offsets using a respective one or more offset calculation algorithms, each set preferably including offset calculations for all respective pairwise combinations to be considered as discussed above. There are multiple methods of calculating offsets between two images that have a common sub-area. Generally the process is restricted to those that use linear offsets in X and Y, although this is not limiting and other suitable techniques may be employed in various embodiments. As depicted, three categories of calculation algorithms are provided that yield linear offsets in X and Y. Block 1408 provides autocorrelation based algorithms, block 1410 provides information-theoretic algorithms, and block 1412 provides feature-tracking based algorithms. Within each category there are many specific implementations and variants that may be used alone or in combination with other algorithms and variants within the category or from other categories. The selection of suitable algorithms may be adjusted based on the application. For scanning semiconductor samples, the present inventors tested multiple algorithms from all three categories. In particular, block 1408 provides three known autocorrelation based algorithms. The first shown is normalized cross correlation on the images directly, using the intensity values. The second is normalized cross correlation on the gradient images, where the gradient of an image may be calculated in multiple ways. The presently preferred implementation of this algorithm calculates the gradient using a modified version of the Kirsch operator. The third technique is phase auto-correlation. Additionally, at block 1410, in parallel to using one or more of the techniques of block 1408, offsets may also be calculated using information-theoretic matching in order to account for scanning variations caused by variation in tip shape and size among the multiple AFM tips. The method used is based on cross cumulative residual entropy which has been shown to be more robust and accurate than mutual information based metrics. A specific correction as defined in Cahill, et al. (*Overlap Invariance of Cumulative Residual Entropy Measures for Multimodal Image Alignment*, Cahill et al, SPIE, February 2009) is employed to account for reduced accuracy in large shifts.

A set of shifts, again preferably using all pairwise combinations, may also be calculated using feature tracking based offset calculations at block 1413. The process may use feature based technique employing a contour detector to generate features as described in Desolneux et al. (*Edge Detection by Helmholtz Principle*, Desolneux et al, Journal of Mathematical Imaging and Vision, 2001) with RANSAC (random sample consensus) used to determine shifts. Other methods to extract features like Scale-invariant feature transform (SIFT), speeded up robust features (SURF), or histogram of oriented gradients (HOG), for example, may also be used. For semiconductor scanning applications, the three autocorrelation-based algorithms were determined through experimentation by the present inventors to be the most effective and are combined in the preferred implementation.

In embodiments where two or more algorithms are used to calculate the offsets, the results must be combined in some manner, or the preferred result selected from among the two or more results. As shown at block 1416, in this embodiment the results are combined with normalized addition to produce a single set of pairwise offsets that best reflects the offsets of the images and therefore the actual offset positions of the AFM tips. Note that while there are many ways of combining results from multiple algorithms (i.e. median, highest confidence, weighted by other means, etc), a normalized addition of the results across all possible shifts provided the best performance in experiments with semiconductor scanning data sets.

Figure 15:
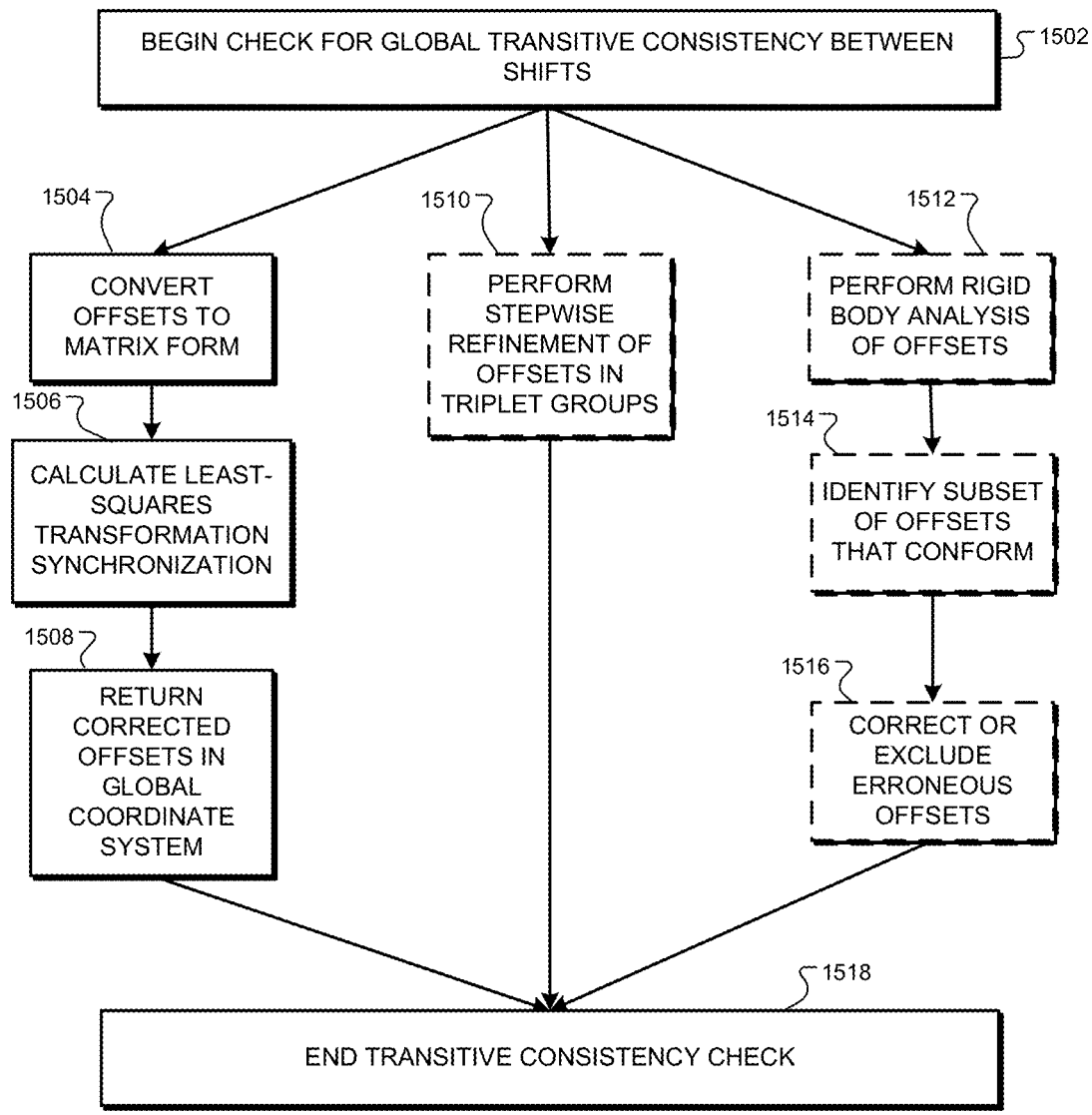
FIG. 15 is a block diagram showing more detail for the process of checking for global transitive consistency between shifts.

FIG. 15 is a block diagram showing more detail for the process of adjusting for shift errors by checking for global transitive consistency between offsets as set forth at block 1106 of FIG. 11. As they are provided by the process of FIG. 14, the offsets between a selected pair of tips, for example a tipA and tipC, should theoretically according to transitive closure be a vector addition of the offsets between tipA and another tip, tipB, and those between tipB and tipC. However, given that the acquired data and the subsequent calculations are affected by noise, transitive closure will not typically be satisfied exactly among scan images of the methods herein. Thus, the process of FIG. 15 adjusts multiple noisy offset measurements based on transitive closure to reduce the error in each measurement and provides a global coordinate system for all tips. This process also provides a way to determine possible erroneous measurement and ask the user to verify and/or adjust those manually if needed. The process starts with the list of pairwise offsets, and produces a list of error-corrected absolute offsets for each AFM tip. It may also provide a set of flags identifying potential erroneous offsets to which corrections were made, or offsets that were not used due to excessive error.

To achieve the transitive consistency check, several different known algorithms are available which may be employed to the offsets as used herein. The present inventors implemented and tested three suitable algorithms for this process, however this is not limiting and other suitable algorithms may be employed to check for and correct transitive consistency errors in the offsets. In some versions, more than one algorithm may be employed and the best performing results selected afterward. FIG. 15 shows three different options which may be implemented alone or in combination in various embodiments. The first option, depicted at blocks 1504-1508, is based on a global correction based on matrix algebra using the algorithm presented in Bernard et al. (*A Solution for Multi-Alignment by Transformation Synchronization*, Bernard et al, arXiv: 1410.8546v2, 14 Apr. 2015), which is hereby incorporated by reference for all purposes. Using this solution, the process at block 1504 first converts the set of offsets to matrix form for calculation with matrix algebra as set forth in Bernard et al. Next, at block 1506, the process calculates a least squares transformation synchronization, which provides a transformed set of offsets with respect to a globally consistent coordinate system, which is beneficial as opposed to referencing from a particular scan image location set which may itself have noise or errors. Next the process at block 1508 returns the transformed offsets in the new global coordinate system. Then at block 1518 the process ends the transitive consistency checking and continues as set forth in FIG. 11. This algorithm was found to have the best performance and is presently preferred as a solution.

For the sake of completeness, two alternative algorithms are also described. As depicted at block 1510, the process may alternatively perform a stepwise refinement of the offsets in triplet groups. One suitable algorithm that may be employed for this is the In this section we formulate an iteratively reweighted least squares (IRLS) solver as found in Ozyseli et al. (*Robust Camera Location Estimation by Convex Programming*, Ozyseli, O., and Singer, A., arXiv: 1412.0165v2, 4 Jun. 2015), which is hereby incorporated by reference for all purposes. The corrected offsets are then provided at block 1518 and the consistency check is ended. A third alternative algorithm for the global consistency check is given at block 1512-1516. This solution starting at block 1512 performs a rigid body analysis, such as that given provided in Kennedy et al. (*Identifying maximal rigid components in bearing-based localization*, Kennedy et al, IEEE/RSJ International Conference on Intelligent Robots and Systems, October 2012), which is hereby incorporated by reference for all purposes. The process identifies a subset of offsets that conform to the rigid body analysis and those that do not. Then at block 1516 the non-conforming values are either corrected or excluded from the analysis.

Figure 16:
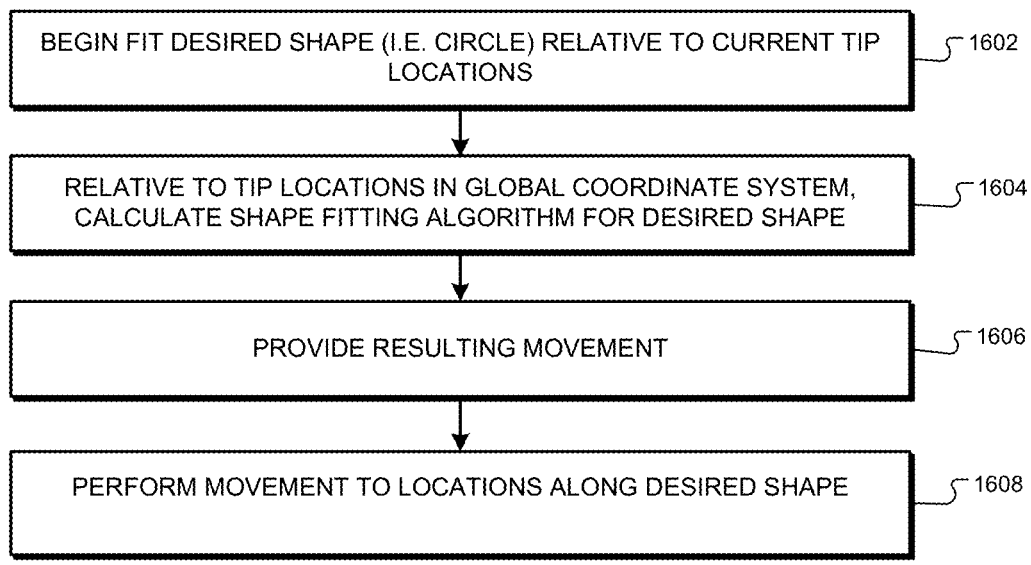
FIG. 16 is a flowchart of a process for fitting a desired shape to the AFM tip locations to align the tips to a new more calibrated position according to an example embodiment.

FIG. 16 is a flowchart of a process for the process at block 1108 (FIG. 11) for fitting a desired shape to the AFM tip locations to align the tips to a new more calibrated position according to an example embodiment. The process preferably uses the adjusted offsets as produced from the process of FIG. 15 or a similar process. From this, the process produces a list of motions needed for each tip to globally coordinate movement for all tips to fit to a desired shape for synchronous scanning, preferably a circle as discussed above. Note that there are typically three to more tips adjusted in this process, therefore only a small proportion of a target circle circumference may be sampled in some scenarios to determine target locations for the tips. Also, the directed motion may be the original tip positions are not as finely calibrated as the target positions, therefore fit produced by the present process should be robust to noise and dislocations. The simple approach to fitting a circle via least squares can be very ill-behaved in the presence of such noise and errors, especially if the arc being sampled is small, and if one or more tip starting points are not close to the circle. The present inventors encountered such problems in experimentation. Better methods to solve such problems include Taubin's method and geometric fitting as described in Sharaqdah et al. (*Error analysis for circle fitting algorithms*, Al-Sharaqdah, A. and Chernov, N., arXiv:0907.0421v1, 2 Jul. 2009) and Ahn et al. (*Geometric Least Squares Fitting of Circle and Ellipse*, Ahn, S., and Rauh, W., International Journal of Pattern Recognition and Artificial Intelligence 13(07):987-996, November 1999), which are hereby incorporated by reference for all purposes. The present inventors implemented several methods and tested them for use within the present invention scanning semiconductor samples, finding the method of Ahn et al. to have the best performance. The process starts with the corrected offsets at block 1602, preferably starting with the best available location data for the AFM tips, such as the results of a global transitive consistency check like that of FIG. 15. Next at block 1604 the actual locations are fed to the shape fitting algorithm, such as the circle or ellipse fitting algorithm of Ahn et al., or another suitable shape fitting process depending on the desired post-calibration arrangement of tips. At block 1606, the process provides the resulting movements for activating the various tip positioners 406 (FIG. 1), and then at block 1608 the controller activates the positioners to perform the movements for each tip to move to its desired location along the desired shape outline. Preferably this is a 0.7 or 0.35 urn circle as described above, but may be a smaller or larger circle or other shape depending on the application. With the tips moved to their new location, the auto-offset and adjustment process is complete for a particular round of calibration.

Some embodiment of the invention provide a method of operating an atomic force microscope (AFM) system under control of a processor, the AFM system including multiple AFM assemblies positioned for scanning a common sample area, each having a cantilever supporting a probe head with at least one tip comprising: positioning the multiple AFM probe heads with their respective tips at a first predetermined relationship to each other; automatically performing a first scan including scanning the tips in synchronicity across a surface and creating, for each tip, a scan image; automatically processing the scan images to recognize a feature appearing in all the scan images having desired spatial characteristics; automatically designating the recognized feature as a common feature and overlaying the scan images together to determine a relative offset for each of the scanning tips; based on the relative offset, automatically positioning the scan tips at a second predetermined relationship to each other, the second relationship placing the tips relatively closer to each other than the first relationship; and after positioning the scan tips at the second predetermined relationship, automatically performing a region of interest scan including scanning the tips in synchronicity across a surface and creating, for each tip, a scan image.

In some embodiments, the desired spatial characteristics of the recognized feature include a designated minimum feature pitch between two feature structures.

In some embodiments, the second predetermined relationship has greater precision than the first predetermined relationship.

Some embodiments further comprise after, positioning the scan tips at the second predetermined relationship, automatically reconfiguring the AFM system for scanning at an increased resolution.

In some embodiments, the second predetermined relationship places the tips along the circumference of an imaginary calibration circle.

In some embodiments, the calibration circle is centered around the common feature of the first scan.

In some embodiments, the AFM system includes at least four AFM assemblies.

Some embodiments further comprise, before performing the region of interest scan: performing a second, fine probe reference scan; automatically processing the scan images of the second scan to recognize a feature appearing in all the scan images having desired spatial characteristics, which may be the designated common feature of the second scan or another feature; automatically designating the recognized feature of the second scan as a common feature and overlaying the scan images of the second scan together to determine a relative offset for each of the scanning tips; based on the relative offset, automatically positioning the scan tips at a third predetermined relationship to each other, the third relationship placing the tips relatively closer to each other than the second relationship; after positioning the scan tips at the second predetermined relationship, performing a third scan including scanning the tips in synchronicity across a surface and creating, for each tip, a scan image.

In some embodiments, the third predetermined relationship has greater precision than the second predetermined relationship.

Some embodiments further comprise, after positioning the scan tips at the third predetermined relationship, automatically reconfiguring the AFM system for scanning at an increased resolution.

In some embodiments, the third predetermined relationship places the tips along the circumference of an imaginary fine calibration circle.

In some embodiments, the fine calibration circle is centered at the common feature of the second scan.

In some embodiments, the fine calibration circle is about 0.35 μm or less in diameter.

In some embodiments, overlaying the scan images of the second scan together to determine a relative offset for each of the scanning tips and based on the relative offset, automatically positioning the scan tips at a third predetermined relationship to each other further comprises pre-processing the scan images of the second scan to remove outlier data and scan artifacts; after the pre-processing, calculating a set of pairwise shifts between respective combinations of the scan images; after calculating the pairwise shifts, adjusting for error by checking for global transitive consistency of the calculated pairwise shifts and applying any resulting adjustments to their respective tip coordinates; after adjusting for error, fitting the tip locations to a desired shape for the third predetermined relationship.

In some embodiments, overlaying the scan images together to determine a relative offset for each of the scanning tips and based on the relative offset, automatically positioning the scan tips at a second predetermined relationship to each other further comprises pre-processing the scan images of the first scan to remove outlier data and scan artifacts; after the pre-processing, calculating a set of pairwise shifts between respective combinations of the scan images; after calculating the pairwise shifts, adjusting for error by checking for global transitive consistency of the calculated pairwise shifts and applying any resulting adjustments to their respective tip coordinates; and after adjusting for error, fitting the tip locations to a desired shape for the second predetermined relationship.

Some embodiments comprise an atomic force microscope (AFM) system, comprising: at least three AFM assemblies positioned for scanning a common sample area, each including a cantilever supporting a probe head with at least one tip, a 3-axis actuator mechanically coupled to the cantilever, control electronics operably coupled to a feedback position sensor for providing calibrated scanning of the probe head, and a deflection sensor positioned to sense deflection of the cantilever; an electronic controller coupled to the control electronics of the AFM assemblies, and operable to generate a scan waveform for each respective AFM assembly; tangible, non-transitory computer readable memory coupled to the electronic controller and containing program code executable by the electronic controller for: automatically performing a first scan, starting from an initial position in which the AFM probe heads are positioned with their respective tips at a first predetermined relationship to each other, the first scan including scanning the tips in synchronicity across a surface and creating, for each tip, a scan image; automatically processing the scan images to recognize a feature appearing in all the scan images having desired spatial characteristics; automatically designating the recognized feature as a common feature and overlaying the scan images together to determine a relative offset for each of the scanning tips; based on the relative offset, automatically positioning the scan tips at a second predetermined relationship to each other, the second relationship placing the tips relatively closer to each other than the first relationship; after positioning the scan tips at the second predetermined relationship, automatically performing a second scan including scanning the tips in synchronicity across a surface and creating, for each tip, a scan image.

Some embodiments comprises one or more tangible, non-transitory computer readable media containing a program product executable by a controller to operate an atomic force microscope (AFM) system, the system having at least three AFM assemblies positioned for scanning a common sample area, the program product containing program code executable for: automatically performing a first scan, starting from an initial position in which the AFM probe heads are positioned with their respective tips at a first predetermined relationship to each other, the first scan including scanning the tips in synchronicity across a surface and creating, for each tip, a scan image; automatically processing the scan images to recognize a feature appearing in all the scan images having desired spatial characteristics; automatically designating the recognized feature as a common feature and overlaying the scan images together to determine a relative offset for each of the scanning tips; based on the relative offset, automatically positioning the scan tips at a second predetermined relationship to each other, the second relationship placing the tips relatively closer to each other than the first relationship; after positioning the scan tips at the second predetermined relationship, automatically performing a second scan including scanning the tips in synchronicity across a surface and creating, for each tip, a scan image.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

Although the present invention and its advantages have been described in detail, it should be understood that various changes, substitutions and alterations can be made herein without departing from the spirit and scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of operating an atomic force microscope (AFM) system under control of a processor, the AFM system including multiple AFM assemblies positioned for scanning a common sample area, each having a cantilever supporting a probe head with at least one tip, the method comprising:
    positioning the multiple AFM probe heads with their respective tips at a first predetermined relationship to each other;
    automatically performing a first scan including scanning the tips in synchronicity across a surface and creating, for each tip, a scan image;
    automatically processing the scan images to recognize a feature appearing in all the scan images having desired spatial characteristics;
    automatically designating the recognized feature as a common feature and overlaying the scan images together to determine a relative offset for each of the scanning tips;
    based on the relative offset, automatically positioning the scan tips at a second predetermined relationship to each other, the second relationship placing the tips relatively closer to each other than the first relationship;
    after positioning the scan tips at the second predetermined relationship, automatically performing a region of interest scan including scanning the tips in synchronicity across a surface and creating, for each tip, a scan image.

2. The method of claim 1, in which the desired spatial characteristics of the recognized feature include a designated minimum feature pitch between two feature structures.

3. The method of claim 1, wherein the second predetermined relationship has greater precision than the first predetermined relationship.

4. The method of claim 1, further comprising after positioning the scan tips at the second predetermined relationship, automatically reconfiguring the AFM system for scanning at an increased resolution.

5. The method of claim 1, in which the second predetermined relationship places the tips along the circumference of an imaginary calibration circle.

6. The method of claim 5, in which the calibration circle is centered around the common feature of the first scan.

7. The method of claim 1, in which the AFM system includes at least four AFM assemblies.

8. The method of claim 1, further comprising, before performing the region of interest scan,
    performing a second, fine probe reference scan;
    automatically processing the scan images of the second scan to recognize a feature appearing in all the scan images having desired spatial characteristics, which may be the designated common feature of the second scan or another feature;

automatically designating the recognized feature of the second scan as a common feature and overlaying the scan images of the second scan together to determine a relative offset for each of the scanning tips;

based on the relative offset, automatically positioning the scan tips at a third predetermined relationship to each other, the third relationship placing the tips relatively closer to each other than the second relationship;

after positioning the scan tips at the second predetermined relationship, performing a third scan including scanning the tips in synchronicity across a surface and creating, for each tip, a scan image.

9. The method of claim 8, wherein the third predetermined relationship has greater precision than the second predetermined relationship.

10. The method of claim 9, further comprising after positioning the scan tips at the third predetermined relationship, automatically reconfiguring the AFM system for scanning at an increased resolution.

11. The method of claim 8, in which the third predetermined relationship places the tips along the circumference of an imaginary fine calibration circle.

12. The method of claim 11, in which the fine calibration circle is centered at the common feature of the second scan.

13. The method of claim 8 in which the fine calibration circle is about 0.35 µm or less in diameter.

14. The method of claim 8, in which overlaying the scan images of the second scan together to determine a relative offset for each of the scanning tips and based on the relative offset, automatically positioning the scan tips at a third predetermined relationship to each other further comprises:

pre-processing the scan images of the second scan to remove outlier data and scan artifacts;

after the pre-processing, calculating a set of pairwise shifts between respective combinations of the scan images;

after calculating the pairwise shifts, adjusting for error by checking for global transitive consistency of the calculated pairwise shifts and applying any resulting adjustments to their respective tip coordinates;

after adjusting for error, fitting the tip locations to a desired shape for the third predetermined relationship.

15. The method of claim 1, in which overlaying the scan images together to determine a relative offset for each of the scanning tips and based on the relative offset, automatically positioning the scan tips at a second predetermined relationship to each other further comprises:

pre-processing the scan images of the first scan to remove outlier data and scan artifacts;

after the pre-processing, calculating a set of pairwise shifts between respective combinations of the scan images;

after calculating the pairwise shifts, adjusting for error by checking for global transitive consistency of the calculated pairwise shifts and applying any resulting adjustments to their respective tip coordinates;

after adjusting for error, fitting the tip locations to a desired shape for the second predetermined relationship.

16. An atomic force microscope (AFM) system, comprising:

at least three AFM assemblies positioned for scanning a common sample area, each including a cantilever supporting a probe head with at least one tip, a 3-axis actuator mechanically coupled to the cantilever, control electronics operably coupled to a feedback position sensor for providing calibrated scanning of the probe head, and a deflection sensor positioned to sense deflection of the cantilever;

an electronic controller coupled to the control electronics of the AFM assemblies, and operable to generate a scan waveform for each respective AFM assembly;

tangible, non-transitory computer readable memory coupled to the electronic controller and containing program code executable by the electronic controller for:

automatically performing a first scan, starting from an initial position in which the AFM probe heads are positioned with their respective tips at a first predetermined relationship to each other, the first scan including scanning the tips in synchronicity across a surface and creating, for each tip, a scan image;

automatically processing the scan images to recognize a feature appearing in all the scan images having desired spatial characteristics;

automatically designating the recognized feature as a common feature and overlaying the scan images together to determine a relative offset for each of the scanning tips;

based on the relative offset, automatically positioning the scan tips at a second predetermined relationship to each other, the second relationship placing the tips relatively closer to each other than the first relationship;

after positioning the scan tips at the second predetermined relationship, automatically performing a second scan including scanning the tips in synchronicity across a surface and creating, for each tip, a scan image.

17. One or more tangible, non-transitory computer readable media containing a program product executable by a controller to operate an atomic force microscope (AFM) system, the system having at least three AFM assemblies positioned for scanning a common sample area, the program product containing program code executable for:

automatically performing a first scan, starting from an initial position in which the AFM probe heads are positioned with their respective tips at a first predetermined relationship to each other, the first scan including scanning the tips in synchronicity across a surface and creating, for each tip, a scan image;

automatically processing the scan images to recognize a feature appearing in all the scan images having desired spatial characteristics;

automatically designating the recognized feature as a common feature and overlaying the scan images together to determine a relative offset for each of the scanning tips;

based on the relative offset, automatically positioning the scan tips at a second predetermined relationship to each other, the second relationship placing the tips relatively closer to each other than the first relationship;

after positioning the scan tips at the second predetermined relationship, automatically performing a second scan including scanning the tips in synchronicity across a surface and creating, for each tip, a scan image.

* * * * *